(12) United States Patent
Colson et al.

(10) Patent No.: US 7,755,050 B2
(45) Date of Patent: Jul. 13, 2010

(54) EXPLOSIVE DEVICE DETECTION SYSTEM AND METHOD

(75) Inventors: Kenneth K. Colson, West Tawakoni, TX (US); Timothy G. Brauer, Carrollton, TX (US)

(73) Assignee: Raytheon Company, Waltham, MA (US)

( * ) Notice: Subject to any disclaimer, the term of this patent is extended or adjusted under 35 U.S.C. 154(b) by 581 days.

(21) Appl. No.: 11/695,957

(22) Filed: Apr. 3, 2007

(65) Prior Publication Data

US 2008/0246619 A1   Oct. 9, 2008

(51) Int. Cl.
 *G01J 5/02*  (2006.01)
(52) U.S. Cl. .................................. 250/339.05
(58) Field of Classification Search ............. 250/339.05
 See application file for complete search history.

(56) References Cited

U.S. PATENT DOCUMENTS

| | | | | |
|---|---|---|---|---|
| 5,555,207 | A | 9/1996 | Barker | 324/121 |
| 6,194,898 | B1 * | 2/2001 | Magnuson et al. | 324/300 |
| 6,323,941 | B1 * | 11/2001 | Evans et al. | 356/4.01 |
| 7,151,447 | B1 * | 12/2006 | Willms et al. | 340/540 |
| 7,315,037 | B1 * | 1/2008 | Page et al. | 250/504 R |
| 2007/0153974 | A1 * | 7/2007 | Smith | 378/57 |

FOREIGN PATENT DOCUMENTS

| | | |
|---|---|---|
| FR | 2 766 627 | 1/1999 |
| WO | WO 01/37000 | 5/2001 |

OTHER PUBLICATIONS

PCT; International Search Report and Written Opinion; (IS/EPO) for PCT/US2008/054947 (14 pages), Jun. 18, 2008.
European Patent Office, Communication pursuant to Article 94(3) EPC, Application No. 08 730 703.9-2217; 6 pages, Feb. 2, 2010.

* cited by examiner

*Primary Examiner*—David P Porta
*Assistant Examiner*—Marcus H Taningco
(74) *Attorney, Agent, or Firm*—Baker Botts L.L.P.

(57) ABSTRACT

In one embodiment of the disclosure, an explosive device detection system includes a thermal imaging camera and at least one radio frequency receiver that is coupled to a signal processing circuit. The thermal imaging camera is operable to produce a first electrical signal indicative of thermal energy radiated by an explosive device. The at least one radio frequency receiver is operable to produce at least one second electrical signal indicative of electro-magnetic energy emitted by the explosive device. The signal processing circuit is configured to combine the first electrical signal and the at least one second electrical signal on a display such that the explosive device is aligned on the display.

22 Claims, 4 Drawing Sheets

EXPLOSIVE DEVICE DETECTION SYSTEM AND METHOD

TECHNICAL FIELD OF THE DISCLOSURE

This disclosure generally relates to detection devices, and more particularly, to an explosive device detection system and method of operating the same.

BACKGROUND OF THE DISCLOSURE

Thermal imaging cameras are designed to detect thermal energy that is generated by heat generating objects. A forward looking infrared receiver (FLIR) is one type of thermal imaging camera that is configured to create an electrical signal using this thermal energy. For military purposes, forward looking infrared receivers have become useful in identifying enemy equipment, such as weapons or artillary that is not readily identified using known imaging equipment.

An improvised explosive device (IED) is a particular type of explosive device that may be constructed using readily available components. The improvised explosive device generally includes an explosive that is detonated by a communication device. The communication device is typically a cellular telephone, however, the communication device may also be any communication device capable of receiving electromagnetic energy and converting this energy into signals necessary to trigger the explosive. Examples of other communication devices includes remote garage door openers, remote home appliances, remote doorbells, and personal communication devices, such as walkie-talkies.

SUMMARY OF THE DISCLOSURE

In one embodiment of the disclosure, an explosive device detection system includes a thermal imaging camera and one or more radio frequency receivers that are coupled to a signal processing circuit. The thermal imaging camera is operable to produce a first electrical signal indicative of thermal energy radiated by an explosive device. The one or more radio frequency receivers are operable to produce a corresponding one or more second electrical signals indicative of electro-magnetic energy emitted by the explosive device. The signal processing circuit is configured to combine the first electrical signal and the one or more second electrical signals on a display such that the explosive device is aligned on the display.

Embodiments of the disclosure may provide numerous technical advantages. Some, none, or all embodiments may benefit from the below described advantages. According to one embodiment, the signal processing circuit may use a first electrical signal from the thermal imaging camera in conjunction with a second electrical signal from radio frequency receiver to detect explosive devices including communication devices, such as cellular telephones, remote appliance controllers, remote doorbells, walkie-talkies, and the like with a higher degree of probability than when a thermal imaging camera is used by itself. Thus, the radio frequency receiver may be capable of detecting electro-magnetic energy from a field of view in order to further discriminate infrared energy provided by the thermal imaging device.

Other technical advantages will be apparent to one of skill in the art.

BRIEF DESCRIPTION OF THE DRAWINGS

A more complete understanding of embodiments of the disclosure will be apparent from the detailed description taken in conjunction with the accompanying drawings in which.

DETAILED DESCRIPTION OF SEVERAL EXAMPLE EMBODIMENTS

Thermal imaging cameras, such as forward looking infrared receivers, have been useful in detecting explosive devices, such as improvised explosive devices, due to thermal energy generated by various components in the explosive device. In practice, however, thermal imaging cameras have only been moderately successful in detecting explosive devices. Statistics show that only about 47 percent of explosive devices are detected using thermal imaging cameras, such as forward looking infrared receivers. Thus, only moderate detectability of explosive devices are provided when thermal imaging cameras are used without any additional detection mechanisms.

Figure 1:
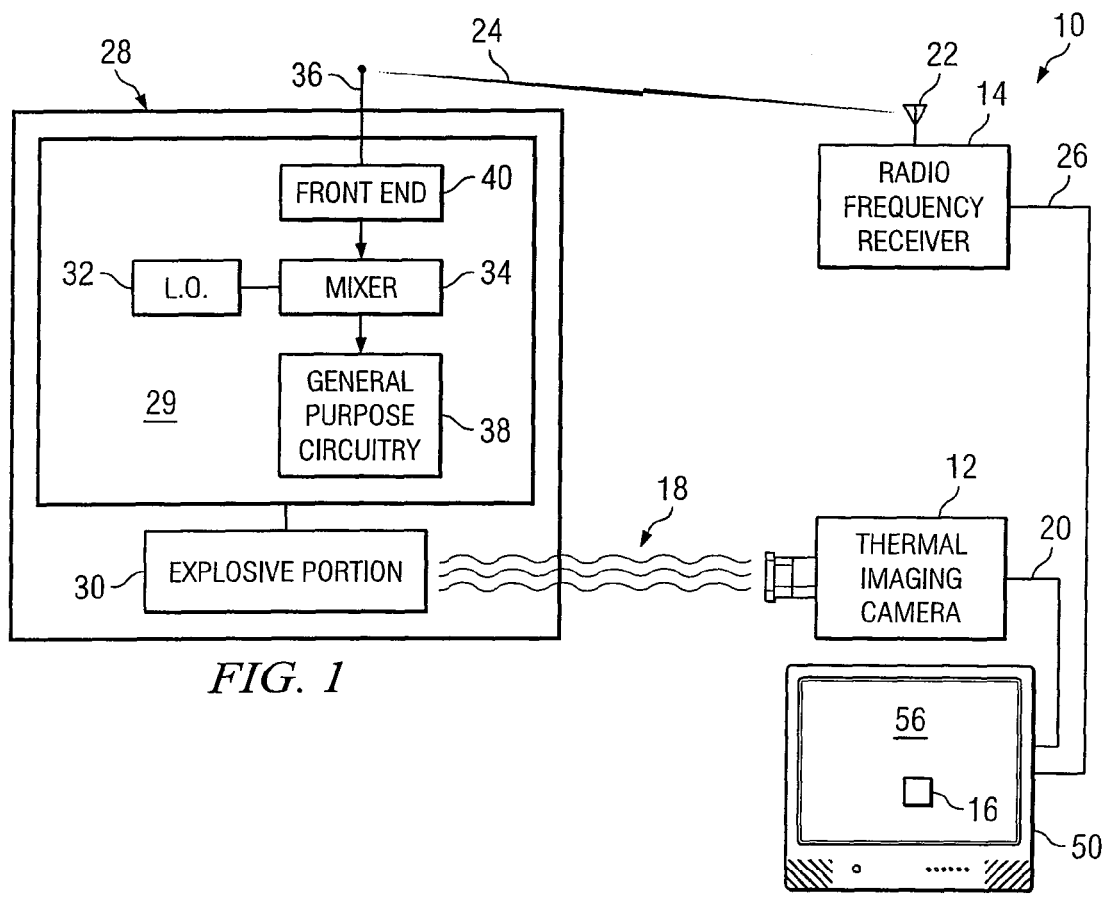
FIG. 1 is a diagram view of one embodiment of an explosive device detection system according to the teachings of the present disclosure.

FIG. 1 shows one embodiment of an explosive device detection system 10 that may be capable of detecting explosive devices with a relatively higher degree of probability than with known detection systems utilizing "stand alone" thermal imaging cameras. Explosive device detection system 10 includes a thermal imaging camera 12 and a radio frequency receiver 14 that are coupled to signal processing circuit 50. Thermal imaging camera 12 is configured to detect thermal heat 18 emanating from an explosive device 28 and produce an electrical signal 20 for use by signal processing circuit 50. In one embodiment, thermal imaging camera 12 is a forward looking infrared receiver. Radio frequency receiver 14 has a directional antenna 22 that is configured to detect electro-magnetic energy 24 emitted by explosive device 28 and produce a corresponding electrical signal 26. As will be described in greater detail below, signal processing circuit 50 may be operable to combine electrical signal 20 with electrical signal 26 such that thermal energy 18 and electro-magnetic energy 24 from explosive device 28 is aligned on a display 56. In one embodiment, signal processing circuit 50 may be operable to display electrical signal 26 as an icon 16 on display 56.

Explosive device 28 generally includes a communication device 29 and an explosive portion 30. In one embodiment, explosive device 28 may be an improvised explosive device. Communication device 29 generally includes a local oscillator circuit 32 that is coupled to a mixer circuit 34 for converting electro-magnetic energy from an antenna 36 to an intermediate frequency that may be used by general purpose circuitry 38. Although not designed for this purpose, the local oscillator circuit 32 may produce a signal that leaks through mixer circuit 34 and a front end circuit 40 to antenna 36 where it emits electro-magnetic radiation 24 at the frequency of the local oscillator circuit 32. Thus, leakage of the local oscillator circuit 32 to the antenna 36 may enable detection of a communication device 29 even though the radio is not actively transmitting. Although this signal may be relatively weak, directional antenna 22 may have sufficient gain and the radio frequency receiver 14 may be sufficiently sensitive and/or have signal processing capabilities to discriminate the signal produced by local oscillator circuit 32 from background noise.

Figure 2:
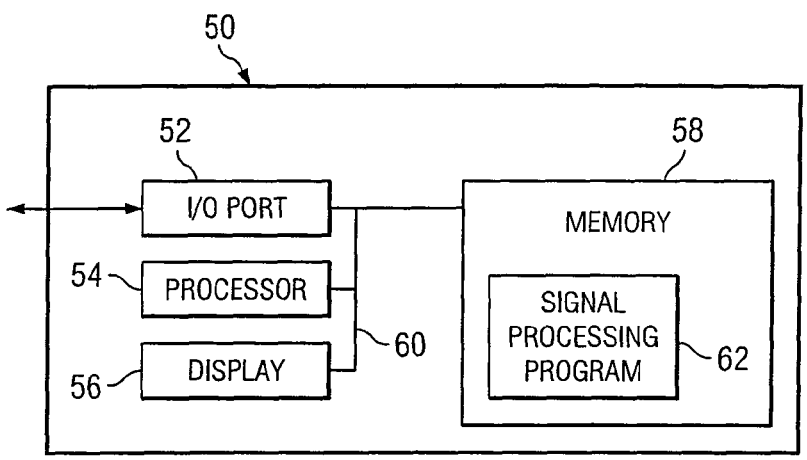
FIG. 2 is a diagram view of one embodiment of a signal processing circuit that may be used with the embodiment of FIG. 1.

FIG. 2 is a block diagram showing one embodiment of signal processing circuit 50 that may be operable to combine electrical signal 20 and electrical signal 26. Signal processing circuit 50 may include one or more input/output ports 52, a processor 54, display 56, and a memory 58 that are coupled together by a system bus 60. The memory 58 may be operable to store various forms of data, which may be, for example, information used by the explosive device detection system 10. Memory 58 may include any volatile or non-volatile memory device, such as read-only memory (ROM), random access memory (RAM), or a fixed storage such as an optical or magnetic bulk data storage medium. The memory 58 is operable to store a signal processing program 62 that may be a plurality of instructions that are executable by processor 54. Display 56 may be a cathode ray tube (CRT), liquid crystal display (LCD), or other device capable of providing visual information to the user.

Input/output port 52 may be coupled to thermal imaging camera 12 and radio frequency receiver 14 for receiving thermal 20 and radio frequency 26 signals from thermal imaging camera 12 and radio frequency receiver 14 respectively. In one embodiment, input/output port 52 may include one or more analog ports for receiving electrical signals 20 and 26 in an analog format. In another embodiment, input/output port 52 may also include one or more digital ports for receiving electrical signals 20 and 26 in a digitized protocol, such as RS-232, universal serial bus (USB), Ethernet, or other suitable device communication protocol.

Display 56 is operable to display information provided by electrical signal 20 and 26 for view by a user. In one embodiment, display 56 may be configured to display a two dimensional raster image of electrical signals 20 and 26. Signal processing circuit 50 may be operable to combine electrical signal 20 and electrical signal 26 on the display 56 such that the general position of a detected explosive device 28 may be displayed at a common location on the display 56. In one embodiment, signal processing circuit 50 may compare received electrical signal 26 with a threshold value such that electrical signal 26 may be squelched on the display if not greater than the threshold value. In another embodiment, the signal processing circuit 50 may be further operable to display electrical signal 26 as a viewable indication, such as icon 16 at its respective location on the display 56 if the threshold value is exceeded.

Explosive device detection system 10 may be configured to detect electro-magnetic energy 24 from communication devices 29 configured on explosive devices 28 that utilize spread spectrum techniques. Spread spectrum techniques may be used by communication devices, such as cellular telephones, to reduce interference, jamming, and multi-path distortion. Spread spectrum techniques may also be used to enhance privacy or security by transmitting electro-magnetic energy at a number of differing carrier frequencies. Thus, reception of a spread spectrum signal may incorporate a radio frequency receiver 14 that operates at an associated number of differing frequencies. Thus in one embodiment, signal processing program 62 may be configured to receive a number of relative signal strength values of a number of differing frequencies that form the spread spectrum signal and store these relative signal strength values in memory 58. Signal processing program 62 may then calculate one or more discrete Fourier transforms over relative signal strength values stored in memory 58 and compare these results with one or more threshold values.

Figure 3:
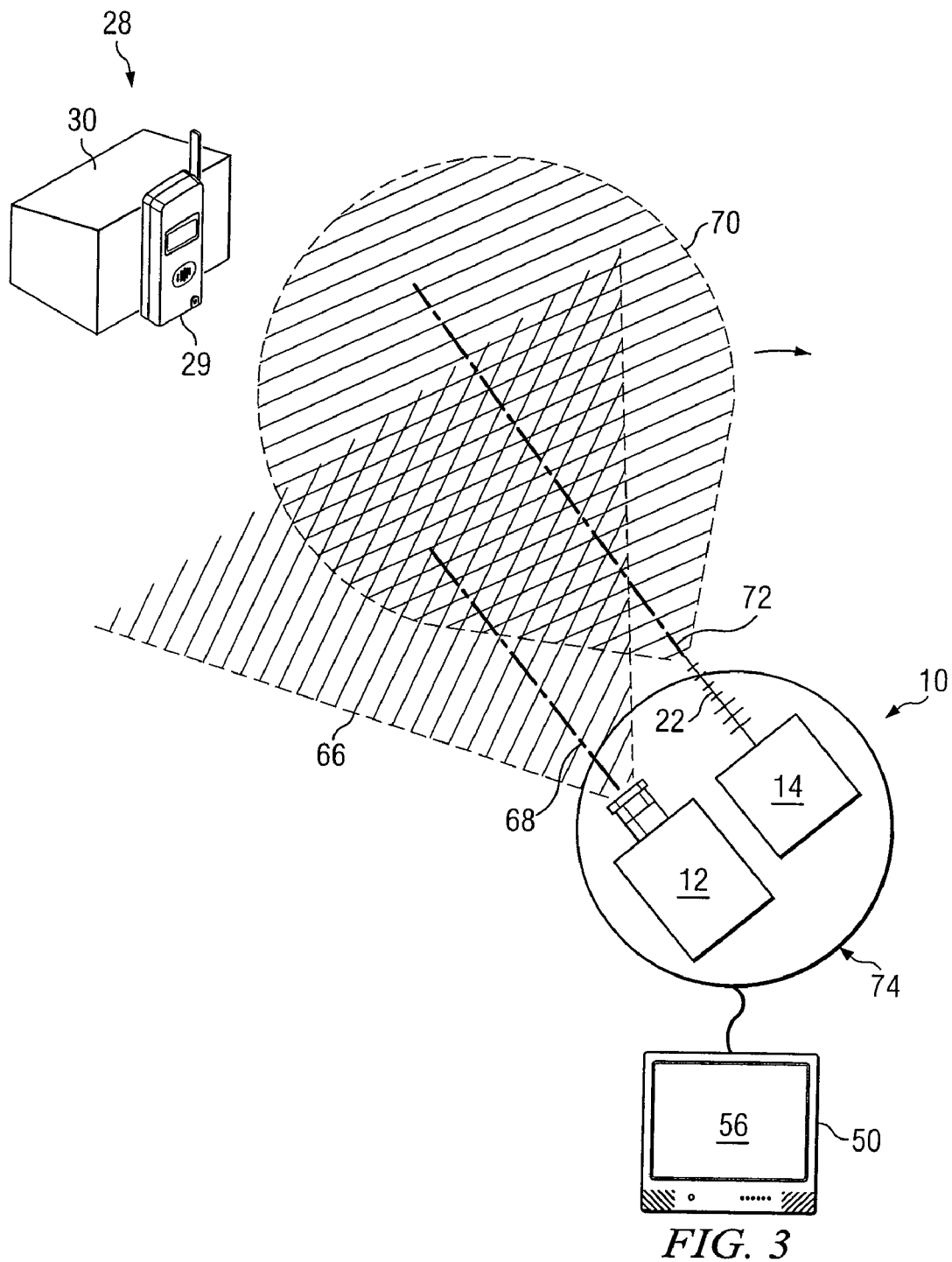
FIG. 3 is a plan view of the embodiment of FIG. 1 showing the arrangement of the thermal imaging camera in relation the directional antenna of FIG. 1.

FIG. 3 is a plan view of one embodiment of explosive device detection system 10 showing a physical arrangement of the directional antenna 22 relative to the thermal imaging camera 12. Thermal imaging camera 12 has a field of view 66 that generally corresponds with the azimuthal extent of display 56. The field of view 66 generally refers to a radial segment of the environment that may be viewed at any one time. The field of view 66 has an associated axis 68 that extends through its center. Directional antenna 22 has a field pattern 70 that generally determines the directionality of the directional antenna 22. Directional antenna 22 may be any suitable type of antenna that has sufficient directionality to discriminate electro-magnetic energy beyond the field of view 66 of the thermal imaging camera 12. In one embodiment, directional antenna 22 may be operable to receive electro-magnetic energy 24 at the frequency of the communication device's local oscillator circuit 32. In another embodiment, directional antenna 22 may be a yagi-uda antenna. Field pattern 70 has an associated axis 72 that extends outwardly from directional antenna 22 through the center of the field pattern 70.

Directional antenna 22 may be attached to thermal imaging camera 12 such that the axis 72 of directional antenna 22 is aligned at a specified angular orientation relative to the axis 68 of thermal imaging camera 12. In one embodiment, axis 72 and axis 68 may be generally parallel to each other. In this manner, a particular explosive device 28 that is detected by thermal imaging camera 12 may be simultaneously detected by directional antenna 22.

In one embodiment, thermal imaging camera 12 and directional antenna 22 may be mounted on a rotational mechanism 74 in order to allow radial scanning of electrical signal 20 and electrical signal 26. Rotational mechanism 74 may include a motor drive to provide for rotation of thermal imaging camera 12 and directional antenna 22 at a specified angular velocity. In another embodiment, rotational mechanism 74 may be configured to horizontally rotate thermal imaging camera 12 and directional antenna 22 through a field of regard. That is, by implementation of rotational mechanism 74, a field of regard may be scanned for the presence of explosive devices 28. A field of regard is generally referred to as an area of interest to a user and may generally include a larger radial segment than the field of view 66. In one embodiment, rotational mechanism 74 may be coupled to input/output port 52 such that signal processing program 62 may control its rotational position and velocity. In another embodiment, rotational mechanism 74 may be mounted on a vehicle (not specifically shown) such that explosive device detection system 10 may scan over an azimuthal extent of the surrounding environment in order to detect the presence of explosive devices 28.

Figure 4:
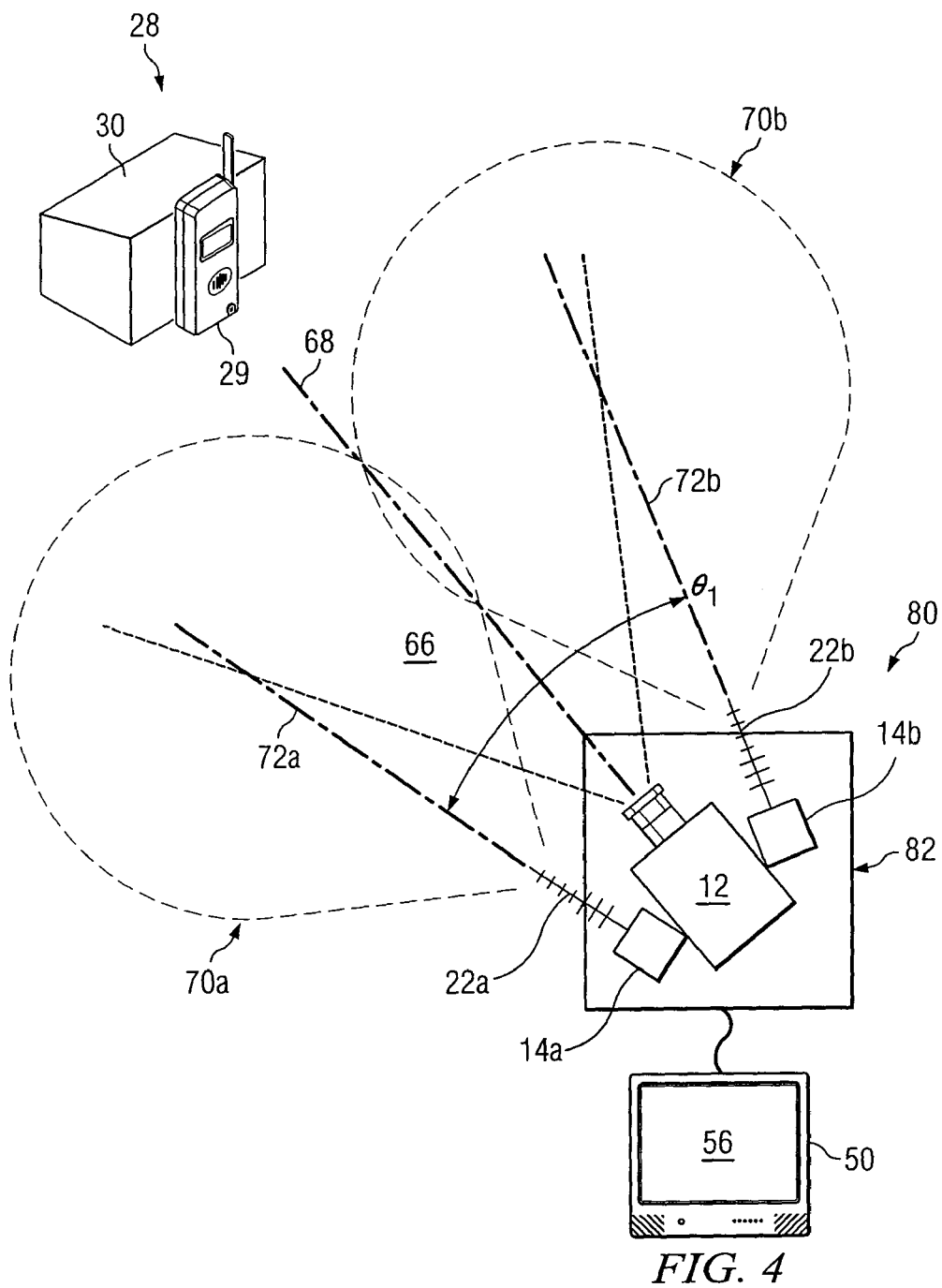
FIG. 4 is another embodiment of the explosive device detection system showing the arrangement of the thermal imaging camera in relation to directional antennas coupled to two associated radio frequency receivers.

FIG. 4 shows another embodiment of an explosive device detection system 80 in which two directional antennas 22a and 22b are used. The thermal imaging camera 12 and signal processing circuit 50 are similar in purpose and design to the thermal imaging camera 12 and signal processing circuit 50 of the embodiment of FIGS. 1 through 3. Explosive device detection system 80 differs, however, in that two radio frequency receivers 14a and 14b and associated directional antennas 22a and 22b are used to detect electro-magnetic energy emitted by explosive device 28. The two radio frequency receivers 14a and 14b are configured to produce two corresponding electrical signals that may have a different phase relative to one another by signal processing program 62. In this manner, an electronically scanned electrical signal may be provided that may extend through the field of regard. That is, an electronically scanned electrical signal may be provided that electronically scans through the field of regard that without physically rotating the explosive device detection system 80.

The explosive device detection system 80 also differs from the embodiment of FIG. 1 in that a stationary mechanism 82 may be used in lieu of the rotational mechanism 74 of FIG. 3. It should be understood, however, that explosive device detection system 80 may also be implemented with the rotational mechanism 74 of FIG. 3 in order to provide a relatively wider field of regard in some embodiments.

Each directional antenna 22a and 22b has a field pattern 70a and 70b and associated axes 72a and 72b. In one embodiment, directional antennas 22a and 22b may be configured such that axes 72a and 72b may include an offset angle $\theta_1$ relative to one another. In this manner, the field patterns 70a and 70b of both directional antennas 22a and 22b may be spatially separated relative to each other and to axis 68 of thermal imaging camera's field of view 66. Although the illustrated embodiment shows two directional antennas 22a and 22b, it should be understood that any quantity of directional antennas 22 may be used in order to detect electromagnetic energy 24 from explosive device 28. Certain embodiments using multiple radio frequency receivers 14 and associated directional antennas 22 may provide an advantage in that an electronically scanned electrical signal may be produced that serves to cancel common mode noise present in the ambient environment.

Figure 5:
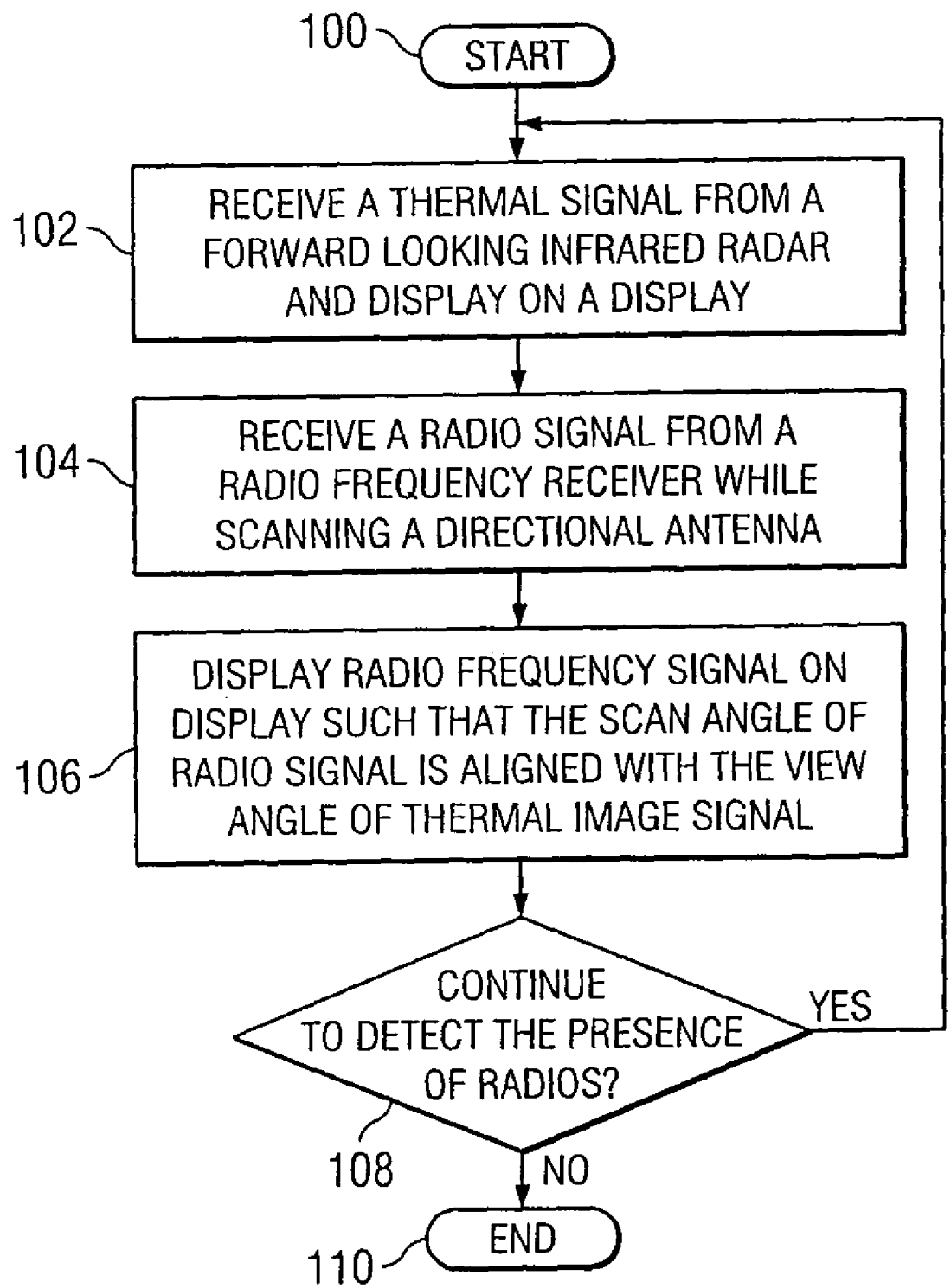
FIG. 5 is a flowchart showing a series of actions that may be performed by the embodiment of FIG. 1 or 4.

FIG. 5 is a flowchart depicting a series of actions that may be taken by signal processing program 62 to implement the various features of the explosive device detection system 10 or 80. In act 100, the explosive device detection system 10 or 80 may be initiated. The explosive device detection system 10 or 80 may be initiated by applying power to each of the thermal imaging camera 12, one or more radio frequency receivers 14, and signal processing circuit 50. In act 102, an electrical signal 20 may be received from thermal imaging camera 12 and subsequently displayed on the display 56. In act 104, electro-magnetic energy 24 may be received from radio frequency receiver while the directional antenna is scanned across the field of view 66. In one embodiment, the directional antenna 22 may be scanned across the field of view 66 by physical rotation of the directional antenna 22 using rotational mechanism 74. In another embodiment, the directional antenna 22 may be scanned by measuring the phase delay between the electrical signal 26 of one radio frequency receiver 14a relative to the electrical signal 26 of another radio frequency receiver 14b.

In act 106, electrical signal 26 is displayed on the display 56 such that electrical signal 26 is aligned with electrical signal 20. Electrical signal 26 may be displayed on display 56 using any suitable approach that may provide a general indication of relative signal strength at varying positions on display 56. In one embodiment, one or more specified threshold values may be provided such that if the one or more electrical signals 26 exceed one or a combination of these threshold values, a viewable indication, such as icon 16, may be displayed at its respective location on the display 56. In another embodiment, a number of discrete Fourier transforms may be computed over specified portions of electrical signal 26 prior to display on display 56. In this manner, relative frequency content may be derived from the electrical signal 26 and stored in memory 58 for later comparison with the one or more threshold values. Implementation of discrete Fourier transforms may enhance the detectability of communication devices configured in explosive devices 28 using spread spectrum transmission techniques in some embodiments.

In act 108, if continued detection of explosive devices 28 is desired, acts 102 through 106 are repeated again. However, is no further detection of explosive devices 28 is desired, the explosive device detection system is terminated in act 110.

An explosive device detection system 10 or 80 has been described in which explosive devices 28 may be detected even when its respective communication device is not actively transmitting a signal. The explosive device detection system 10 or 80 is operable to combine signals from a thermal imaging camera 12 and one or more radio frequency receivers 14 in order to provide a probability of detection that may have not been possible using known thermal imaging camera designs. The signal processing program 62 may also be operable to compute a discrete Fourier transform over electrical signals 26 in order to further enhance the probability of detection of explosive devices 28 using spread spectrum techniques. Thus, explosive device detection system 10 and 80 may provide enhanced detection of communication devices, such as those used in the manufacture of explosive devices 28.

Although the present disclosure has been described in several embodiments, a myriad of changes, variations, alterations, transformations, and modifications may be suggested to one skilled in the art, and it is intended that the present disclosure encompass such changes, variations, alterations, transformations, and modifications as falling within the spirit and scope of the appended claims.

What is claimed is:

1. A detection system comprising:
    a forward looking infrared receiver that is operable to produce a first electrical signal indicative of thermal energy radiated by an improvised explosive device, the forward looking infrared receiver having a field of view with a first axis;
    a plurality of radio frequency receivers that are coupled to a corresponding plurality of directional antennas and operable to produce a plurality of second electrical signals indicative of electro-magnetic energy emitted by the improvised explosive device, each of the plurality of directional antennas having a field pattern with a second axis that is aligned at a specified angular orientation relative to each other and to the first axis; and
    a signal processing circuit coupled to the thermal imaging camera and the plurality of radio frequency receivers, the signal processing circuit being operable to:
        measure a phase of one of the second electrical signals relative to a phase of each of the other plurality of second electrical signals in order to form an electronically scanned second electrical signal;
        combine the first electrical signal and the electronically scanned second electrical signal on a display such that the improvised explosive device is aligned on the display; and
        compare the electronically scanned second electrical signal against a threshold value such that the electronically scanned second electrical signal may be squelched on the display if not greater than the threshold value and display the electronically scanned second electrical signal as an icon on the display if the electronically scanned second electrical signal is greater than the threshold value.

2. The detection system of claim 1, wherein the plurality of second electrical signals each comprises a spread spectrum signal, the signal processing circuit being further operable to perform a discrete Fourier transform over the spread spectrum signal of each of the plurality of second electrical signals.

3. A detection system comprising:
a thermal imaging camera that is operable to produce a first electrical signal indicative of thermal energy radiated by an explosive device;
at least one radio frequency receiver that is operable to produce a corresponding at least one second electrical signal indicative of electro-magnetic energy emitted by the explosive device; and
a signal processing circuit coupled to the thermal imaging camera and the at least one radio frequency receiver, the signal processing circuit being operable to combine the first electrical signal and the at least one second electrical signal on a display such that the explosive device is aligned on the display.

4. The detection system of claim 3, wherein the thermal imaging camera has a field of view with a first axis and the at least one radio frequency receiver is coupled to a corresponding at least one directional antenna having a field pattern with a second axis, the second axis being aligned at a specified angular orientation relative to the first axis.

5. The detection system of claim 4, further comprising a rotational mechanism that is operable to rotate the first and second axes.

6. The detection system of claim 4, wherein the at least one directional antenna is a yagi-uda antenna.

7. The detection system of claim 3, wherein the at least one radio frequency receiver is a plurality of radio frequency receivers coupled to a corresponding plurality of directional antennas, each of the plurality of directional antennas having a field pattern with a second axis that is aligned at a specified angular orientation relative to each other and to the first axis, the signal processing circuit being further operable to measure a phase of one of the second electrical signals relative to a phase of the other plurality of second electrical signals in order to form an electronically scanned second electrical signal.

8. The detection system of claim 3, wherein the explosive device has a local oscillator circuit.

9. The detection system of claim 8, wherein the radio frequency receiver is tuned to the frequency of the local oscillator circuit.

10. The detection system of claim 3, wherein the signal processing circuit is further operable to compare the at least one second electrical signal against a threshold value such that the at least one second electrical signal may be squelched on the display if not greater than the threshold value.

11. The detection system of claim 10, wherein the signal processing circuit is further operable to display the at least one second electrical signal as an icon on the display if the at least one second electrical signal is greater than the threshold value.

12. The detection system of claim 3, wherein the at least one second electrical signal comprises a spread spectrum signal, the signal processing circuit being further operable to perform a discrete Fourier transform over the spread spectrum signal.

13. The detection system of claim 3, wherein the thermal imaging camera is a forward looking infrared receiver.

14. The detection system of claim 3, wherein the explosive device is an improvised explosive device.

15. The detection system of claim 3, the at least one radio frequency receiver operable to produce the corresponding at least one second electrical signal indicative of electro-magnetic energy emitted by the explosive device, without excitation of the explosive device by the detection system.

16. A method for detecting an explosive device comprising:
receiving, using a thermal imaging device, a first electrical signal from the explosive device;
displaying the first electrical signal on a display;
receiving, using at least one radio frequency receiver, at least one second electrical signal from a local oscillator circuit of the explosive device; and
displaying the at least one second electrical signal on the display such that the at least one second electrical signal is aligned with the first electrical signal.

17. The method of claim 16, wherein receiving, using at least one radio frequency receiver, further comprises receiving, using at least one radio frequency receiver that is coupled to an associated at least one directional antenna having a field pattern with an associated second axis that is aligned at a specified angular orientation relative to a first axis of the field of view of the thermal imaging camera.

18. The method of claim 17, further comprising rotating the thermal imaging device and at least one directional antenna at a specified angular velocity.

19. The method of claim 16, wherein receiving, using at least one radio frequency receiver further comprises receiving, using at least one radio frequency receiver, a corresponding at least one second electrical signal from a local oscillator circuit of the explosive device.

20. The method of claim 16, further comprising comparing the at least one second electrical signal against a threshold value such that the at least one second electrical signal may be squelched on the display if not greater than the threshold value.

21. The method of claim 20, further comprising displaying the at least one second electrical signal as an icon if the at least one second electrical signal is greater than the threshold value.

22. The method of claim 16, wherein receiving, using at least one radio frequency receiver, at least one second electrical signal, further comprises receiving, using at least one radio frequency receiver, a spread spectrum signal from the explosive device and performing a discrete Fourier transform over the spread spectrum signal.

* * * * *